United States Patent [19]
Jones et al.

[11] Patent Number: 5,648,049
[45] Date of Patent: Jul. 15, 1997

[54] PURGING ELECTROSTATIC GUN FOR A CHARGED DRY SORBENT INJECTION AND CONTROL SYSTEM FOR THE REMEDIATION OF POLLUTANTS IN A GAS STREAM

[75] Inventors: James T. Jones, Chandler; Larry Kersey, Scottsdale, both of Ariz.; Michael Walters, Fairview, Kans.

[73] Assignee: Alanco Environmental Resources Corp., Scottsdale, Ariz.

[21] Appl. No.: 564,654

[22] Filed: Nov. 29, 1995

[51] Int. Cl.[6] .............................. B01D 50/00; B01J 8/08; B01J 19/08
[52] U.S. Cl. .................. 422/170; 422/177; 422/186.04; 422/216; 95/58; 95/61; 95/107; 95/110; 423/210
[58] Field of Search .............................. 422/170, 177, 422/186.04, 216; 95/58, 61, 107, 110; 423/210

[56] References Cited

U.S. PATENT DOCUMENTS

| | | | |
|---|---|---|---|
| 4,220,478 | 9/1980 | Schuff | 106/281 |
| 4,290,786 | 9/1981 | Schuff | 55/107 |
| 4,305,909 | 12/1981 | Willet et al. | 422/169 |
| 4,650,555 | 3/1987 | Rzad et al. | 204/174 |
| 5,032,154 | 7/1991 | Wright | 422/171 |
| 5,308,590 | 5/1994 | Kersey et al. | 422/170 |
| 5,312,598 | 5/1994 | Kersey et al. | 422/170 |
| 5,332,562 | 7/1994 | Kersey et al. | 423/210 |
| 5,567,226 | 10/1996 | Lookman et al. | 95/3 |

OTHER PUBLICATIONS

U.S. Patent Application Serial No. 08/429,082 "Improved Electrostatic Gun For Injection of an Electrostatically Charged Sorbent into a Polluted Gas Stream".

*Primary Examiner*—Nina Bhat
*Attorney, Agent, or Firm*—M. Reid Russell

[57] ABSTRACT

A purging electrostatic gun for uniformly and essentially completely electrostatically charging the outer surfaces of a flow of sorbent material particles passed therethrough under pressure that are then injected into a polluted gas stream for contacting to electrostatically attract and react to pollutant particles and pollutant gases in that gas stream that are then removed in a conventional pollution control filtration device. The purging electrostatic gun includes a housing wherein a charging electrode is maintained that is electrically coupled to receive a high voltage and is axially centered in a cylindrical barrel charging section wherethrough a laminar flow of sorbent material is directed. The charging electrode has a forward portion that extends beyond a barrel charging section forward end and is immediately opposite to a surface of a grounding ring or collar. The grounding ring or collar is maintained in the housing and is connected to earth ground. A purging air flow is directed into the housing to pass across the barrel charging section outer surface and the grounding ring or collar surface to prohibit sorbent particles from collecting on the grounding ring or collar as could interfere with generation of a corona discharge that extends from the charging electrode end portion radially wherethrough the sorbent material particles travel and are electrostatically charged.

15 Claims, 2 Drawing Sheets

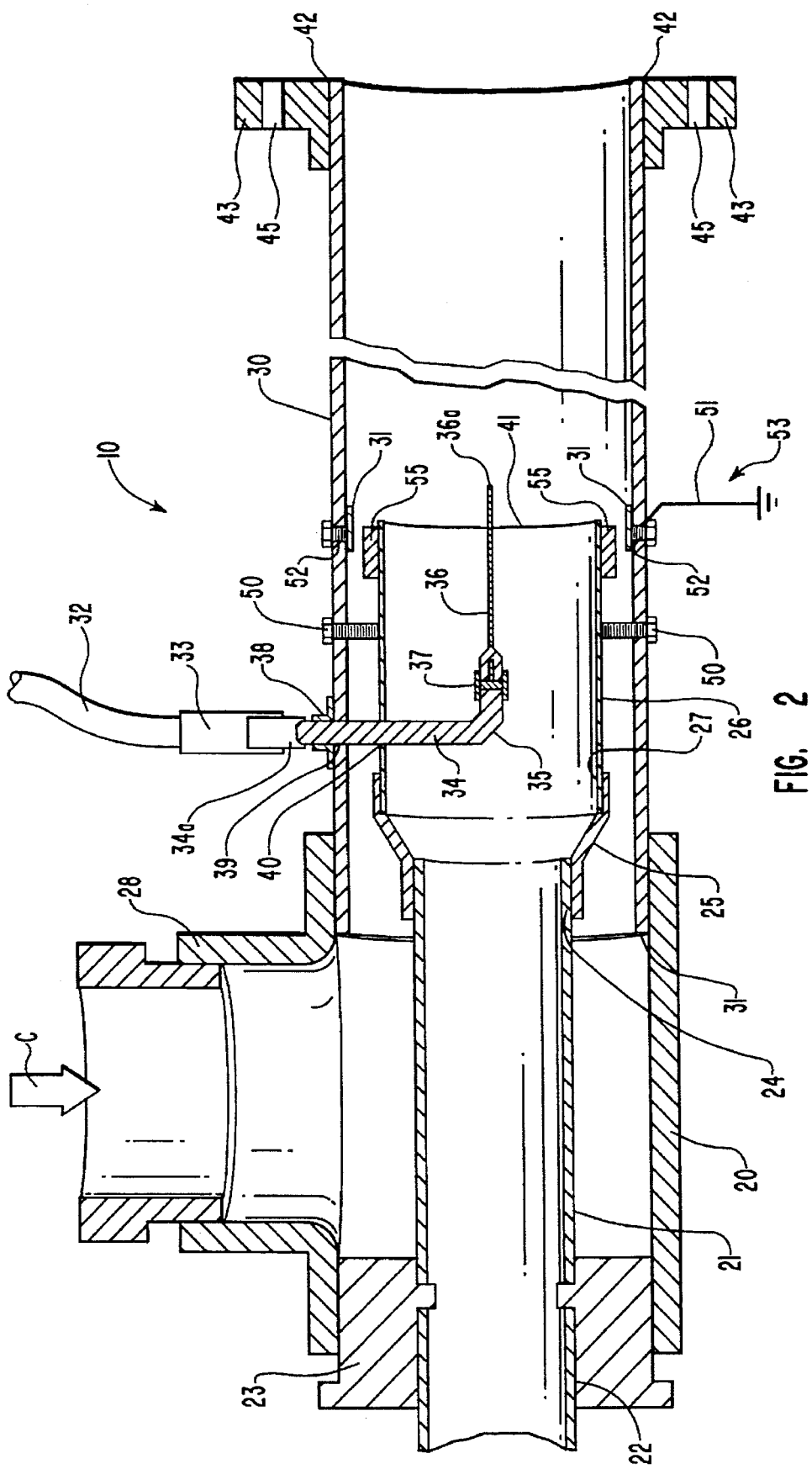

5,648,049

PURGING ELECTROSTATIC GUN FOR A CHARGED DRY SORBENT INJECTION AND CONTROL SYSTEM FOR THE REMEDIATION OF POLLUTANTS IN A GAS STREAM

BACKGROUND OF THE INVENTION

1. Field of the Invention

This invention relates to devices and systems for providing electrostatic charging of dry sorbent particles for injection into a polluted gas stream for the remediation of pollutants in that gas stream.

2. Purpose of the Invention

The invention provides a self or continuous purging electrostatic gun type device for use in a remediation and elimination of major industrial pollutants as are found in a flue gas stream. The invention provides for greatly improving sorbent particle charging efficiency over earlier like devices. The invention is for utilization in a system for the removal of a majority of the pollutants as are by-products from coal-fired power plants, soil remediation plants, steel plants, chemical plants, smelters and municiple incinerators. Pollution remediation systems as would employ the invention are commonly known as dry systems that have been shown to require a significantly lower capital investment than that required for wet systems, but, prior to the present invention, have not performed as efficiently as such wet systems.

3. Prior Art

The present invention is used in a practice of a dry flue gas remediation process that involves a utilization of electrostatically charged dry sorbent particles for introduction into a polluted gas stream in the remediation of pollutants in that gas stream. Such sorbent injection systems involve three major systems to maximize charged sorbent particle density and minimize reaction time and sorbent usage. The systems provide for the management of the sorbent particle flow rate, sorbent particle feed rate, and the generation of a corona discharge to provide sorbent particle charging and its control, for a specific sorbent compound. Sorbent compounding includes sorbent selection and a determination of both the sorbent flow and feed rate, and is based upon the type and amount of pollutant(s) as are present in a gas stream. Compounding also takes into account the chemical reaction rate of charged sorbent particles to pollution particles and is a surface phenomena. Accordingly, the type of sorbent material that is selected, its concentration and particle size will greatly effect charging effectiveness and therefore the costs of system operation. The characteristic of the selected sorbent include: its density; hygroscopic properties; and the like, are used to calculate the rate of feed.

Summarizing, the sorbent feed rate is determined by the stoichiometric properties of the pollutants and the selected sorbent, with the sorbent injection and the flow rate of air injected into the sorbent flow selected to minimize the volume of air that enters the flue gas stream.

The present invention, for use in such remediation system, provides a charging gun that is operated to generate a corona discharge around a charging electrode wherethrough the sorbent is directed and provides, during system operation, a purging air flow directed across a grounding ring or rings, that prohibits sorbent particles for collecting thereon.

The electrostatic gun of the invention provides for charging dry sorbent particles that are then injected into a polluted gas stream to create a large charged surface area in that gas flow or stream for enhancing the chemical reaction between the pollutants and sorbent. Such electrostatic guns and systems for their use are, of course, not new. However, while such have heretofore been available, they have not, prior to the present invention, achieved the sorbent charging efficiency of the present invention that is a dramatic improvement over such earlier devices. For example, a device of one of the present inventors, U.S. Pat. No. 5,312,598, shows an electrostatic charging gun for use in a system to provide for remediation of pollutants in a gas stream and for removing charged pollution particles therefrom that the present invention improves upon. Also, an improved electrostatic charging gun of two of the present inventors is shown in a U.S. patent application Ser. No. 08/429,082, entitled, "Electrostatic Gun for Injection of an Electrostatically Charged Sorbent into a Polluted Gas Stream". Further, other U.S. patents of one of the present inventors, U.S. Pat. Nos. 5,308,590 and 5,332,562, show a utilization of an electrostatic charging gun in a remediation system. Additionally, other examples of electrostatic charging guns and antenna particle charging devices are shown in U.S. patents to Schuff, U.S. Pat. No. 4,220,478; and U.S. Pat. No. 4,290,786. Neither of which Schuff patents shows an electrostatic charging arrangement that is like that of the present invention in either its structure or functioning.

The above cited U.S. Pat. No. 5,312,598, and patent application each show an electrostatic charging gun with a proven capability for charging sorbent particles in a sorbent material flow that is directed therethrough. While, in practice, each of these charging guns has proven to be effective, when used in an apparatus like that of the above cited U.S. Pat. No. 5,308,590, each charging gun has failed to consistently charge a high percentage of sorbent particles in the sorbent flow. To compensate, a higher volume of sorbent material has been required to be used than would be necessary if the percentage of charged particles in the flow were improved. For the gun of U.S. Pat. No. 5,308,598, the charging failure occurred because a corona discharge produced around a charging electrode of the gun did not extend across the gun barrel. Whereas, for the improved electrostatic gun of the above cited U.S. patent application, it has been found that sorbent particles tended to collect on the surface of charging rings, interfering with the formation of a corona discharge across the gun barrel between the charging electrode and grounding ring surfaces. The electrostatic charging gun of the invention provides for and maintains, a purging air flow directed over a grounding ring, insuring the maintenance of a corona discharge at the electrode and a dense field of free electrons that extend from the charging electrode to the grounding ring, wherethrough a continuous even flow of sorbent particles are directed. The grounding ring or rings are thereby kept free of sorbent particles as collected thereon that interfere with a corona discharge generated at the charging electrode that the discharge to thereby extend essentially across the sleeve end, greatly improving particle charging efficiency over earlier electrostatic charging guns. Sorbent particle charging is thereby more efficiently provided and at a decrease in required electrical power over earlier systems.

SUMMARY OF THE INVENTION

It is a principal object of the present invention to provide an improved purging electrostatic gun for use in a system for the remediation of flue gas pollutants that is operated to electrostatically charge a flow of sorbent particles as are selected for the particular pollutants present in a gas stream, which charged sorbent flow is passed, under pressure, through the gun and into the polluted gas flow or stream to create an area of charged sorbent particles therein that react with the pollution particles as are in that gas flow to produce a non-hazardous by-product.

Another object of the present invention is to provide an improved purging electrostatic gun that will generate a corona therein around a charging electrode and extending outwardly, from an end portion of a charging electrode, towards a grounding ring, ring sections or plates that are electrically attractive to a charge on the electrode end section and arranged at an appropriate distance from the charging electrode to promote formation of the corona therebetween, and further providing a purging air flow that is directed over the ground ring, ring sections or plates to prohibit collection of sorbent particles thereon as could effect corona discharge formation and maintenance.

Another object of the present invention is to provide an improved purging electrostatic gun for generating a corona discharge for uniformly electrostatically charging the entire surface of each particle in a flow of sorbent materials passed therethrough, the gun arranged for providing for varying the power to the corona discharge, as required, to fully charge the surfaces of essentially all the particles in that sorbent flow.

Another object of the present invention is to provide an improved purging electrostatic gun whose capacity can be varied for handling and electrostatically charging a flow of sorbent materials that are selected, taking into account the sorbent particles size, surface area, density and hygroscopic properties, to provide an optimum feed rate, for the remediation of pollutants as are determined to be present in a gas stream, and to direct the charged sorbent particles into for dispersal in the gas stream to create area of charged particles therein to essentially enhance the chemical reaction with the pollutant particles in that gas stream and to produce a non-hazardous by-product.

Still another object of the present invention is to provide an improved purging electrostatic gun that is suitable for operation with one or more like electrostatic guns to provide for electrostatically charging a particular volume of sorbent materials as are required to remediate or react with a particular volume of pollutants that are present in a gas stream.

Still another object of the present invention is to provide an improved purging electrostatic gun to receive a variable supply of electrical power that can be set to a minimum power as required to charge essentially all the particles in a flow of a sorbent material that is safe, reliable to use and is relatively inexpensive to maintain and operate.

These and other objectives of the present invention will become apparent to those knowledgeable and skilled in the art from the description set out below.

Briefly, the improved purging electrostatic gun of the present invention provides for electrostatically charging a flow of sorbent materials directed therethrough that are for injection into a gas flow or stream to react with pollution particles in a process for the remediation and removal of the pollutant particles. For such use, sorbent compound selection will take into account the required stoichiometric ratio between the pollutants as are actually found in a particular gas flow or stream and the sorbent compound. The characteristics of the sorbent particles to be considered include particle size distribution, chemical formula, surface area, density and hygroscopic properties, and the like. The improved purging electrostatic gun of the invention receives a volume flow of sorbent material selected for the particular type and amount of pollutants(s) as are determined to be present in the gas stream. The sorbent is conveyed to and through the charging chamber of the electrostatic gun with a dilute phase pneumatic conveying system which provides for the even distribution of the sorbent particles. So arranged, a required flow rate of sorbent particles will be electrostatically charged in its passage through a corona discharge within the gun, with essentially all the sorbent particles in that flow being charged. A corona discharge is formed across an end of a barrel charging sleeve, between an end section of a charging electrode and a grounding ring, collar or plates, with the charged sorbent particles then injected into the polluted gas flow or stream. For maintaining sorbent particle charging efficiency, during operation, the invention provides a continuous purging air flow directed over the grounding ring or collar to prevent any sorbent particles from adhering to that grounding ring or collar surface as could disrupt the creation and efficiency of the corona discharge.

The charged sorbent particles injected into the gas stream create a charged area within that flow, attracting and reacting with pollution particles that come in contact with the charged sorbent particles. The charged sorbent and pollution particles tend to agglomerate, and attract or are attracted to gaseous particles to also react therewith. The charged agglomerated particles and reacted pollutant gaseous particles are of a size to be conveniently removed utilizing a conventional bag house, electronic precipitator, moving media bed system, or the like, cleaning the gas stream, with that clean flow then being suitable for venting to atmosphere.

The improved purging electrostatic gun of the invention is mounted to pass electrostatically charged sorbent particles into a polluted gas transfer line, and can be shaped and sized appropriately for the particular polluted gas flow. Also, more than one charging gun can be arranged to provide a flow of charged sorbent particles into the polluted gas transfer line, as required.

The charging electrode is maintained in the longitudinal center of the barrel charging sleeve of the improved purging electrostatic gun of the invention, and is spaced equidistantly from the grounding ring, collar or plates that carry a different electrical potential from that carried on the charging electrode. The corona discharge is created around that charging electrode end that extends across the barrel charging sleeve open end wherethrough the distributed flow of sorbent material passes and is electrostatically charged in that passage. The individual sorbent particles each absorb the charge over their entire surface. The diameter of the charging electrode to the spacing distance from the grounding ring, collar or plates is selected to promote a corona discharge that will extend therebetween at lower electrical power requirement as earlier like devices have required to produce a corona discharge. The efficiency of which corona discharge is maintained during operations by a continuous purging air flow directed over the grounding ring or collar surface to direct sorbent particles as could interfere with the corona discharge away from the grounding ring or collar.

For the invention, the grounding ring or collar is electrically connected to earth ground. The charge on the charging electrode is thereby attracted to the grounding ring, collar, or plates, promoting the formation of the corona discharge around the electrode end section that produces a dense electron field that extends outwardly toward the grounding ring, collar or plates.

In practice, to provide for formation of a corona discharge extending from around the charging electrode end section, without creating arcing, a ratio of the grounding ring, collar or plates to the charging electrode diameters depends on the application which ratio is approximately 50 to 1. So arranged, a voltage of up to 300,000 volts at up to 5.0 milliamps can be passed to the charging electrode to produce a corona discharge that will extend outwardly from around the charging electrode end section, radially towards the grounding ring, collar or plates wherethrough essentially all the sorbent particles will pass. The flow of sorbent particles is directed as an evenly distributed flow along the charging electrode to pass through that corona discharge, essentially charging the entire surface of each sorbent particle that are then injected into and are dispersed throughout the polluted gas flow or stream.

The barrel size of the purging electrostatic gun of the invention is selected for the particular sorbent and air mix flow it is to receive and provides for installing the charging electrode centered in the straight barrel and for connection to a source of electrical energy that is preferably variable. The charged sorbent particles are preferably fine grain particles and, after passage through the electrostatic gun or guns, will all have the same charge and will accordingly repel one another to be rapidly dispersed in the gas stream. This provides a large charged surface area for the enhancement of the chemical reaction with the pollution particulates, and agglomeration with the particulate matter entrained within the polluted gas stream. The gas stream particulate matter that consists of submicron and larger particles, and the sorbent particles pass into a standard bag house, an electrostatic precipitator, a moving media bed filter or other filter bed arrangement, or the like, for removing the particles and thereby cleaning the gas flow or stream that can then be vented to atmosphere.

DESCRIPTION OF THE DRAWINGS

In the drawings that illustrate that which is presently regarded as a best mode for carrying out the invention:

FIG. 2 is an enlarged profile sectional view of the improved purging electrostatic gun of FIG. 1 shown removed from the block flow schematic.

DETAILED DESCRIPTION

Figure 1:
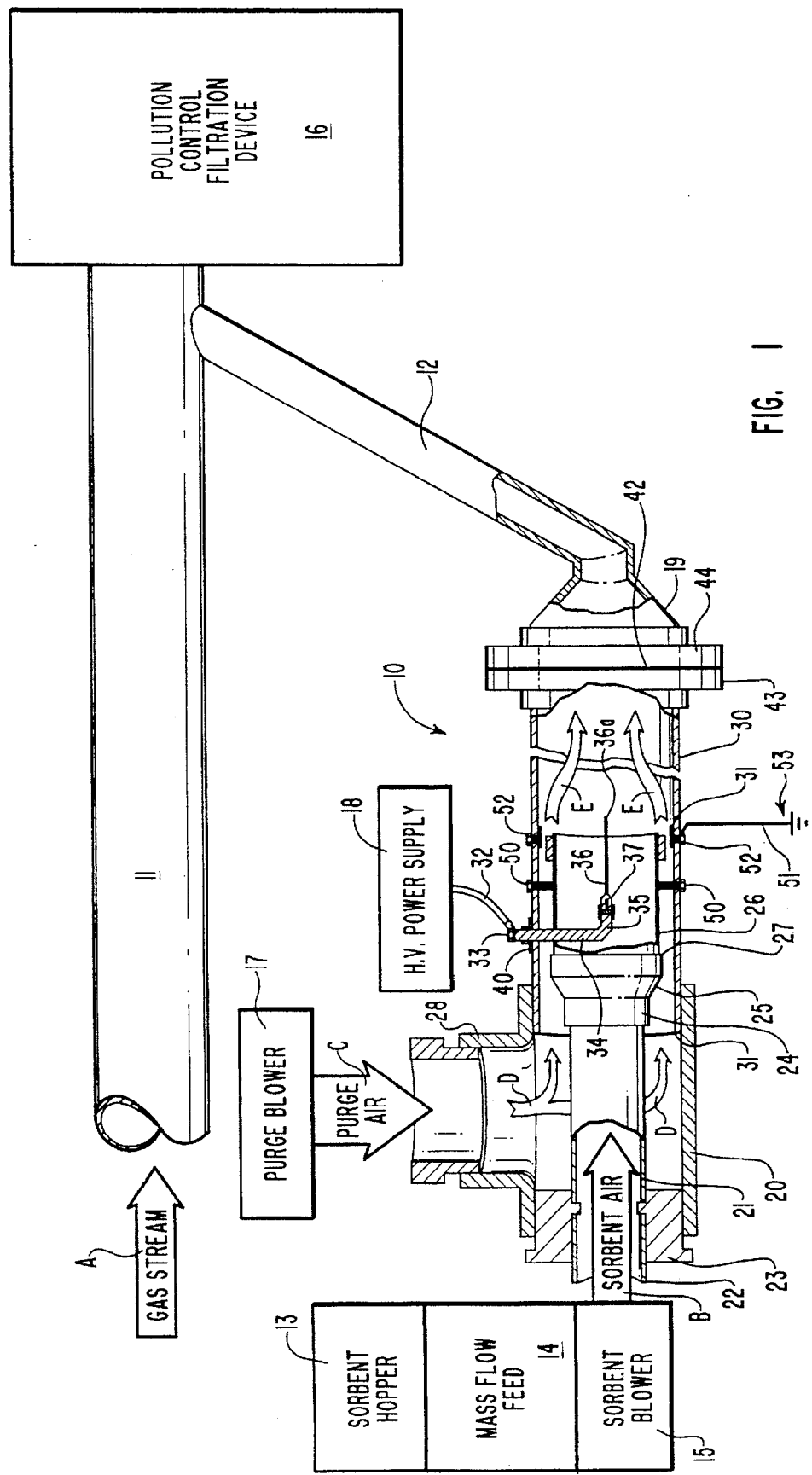
FIG. 1 is a profile sectional view of schematic of the invention in an improved purging electrostatic gun shown as part of a block flow schematic arrangement that provides for charging a flow of sorbent particles and for discharging the charged sorbent particles into a polluted gas stream that connects to a pollution control device, shown as a block, for removing the charged sorbent and pollution particles from that gas flow.

FIG. 1 shows a profile sectional view of an improved self or continuous purging electrostatic gun 10 of the present invention, hereinafter referred to as purging gun, that is shown included in a block flow schematic of a system for removing particulate matter and gaseous pollutants from a gas stream or flow, identified as arrow A, that is shown passing into a tube 11. The purging gun 10 connects, on a forward end, to a sorbent discharge tube 12 that is connected to discharge into the tube 11 to pass thereto a measured flow of charged sorbent particles, under pressure, for mixing in the gas stream A. Before charging, the sorbent particles, arrow B in FIG. 1, are passed from a sorbent hopper, block 13, as a measured flow directed from a mass flow feed, block 14, and are mixed with an air flow in a medium pressure blower, block 15, and are passed therefrom, as a pressurized flow of air with a measured distributed volume of sorbent particles, into the purging gun 10 for charging.

It should be understood, that the respective sorbent hopper 13, mass flow feed 14, sorbent blower 15 and a H. V. power supply 18 are preferably like the respective sorbent feed and power supply arrangements set out in the earlier patent of one of the inventors U.S. Pat. No. 5,312,598 and further discussed in U.S. patent application Ser. No. 08/429, 082 of two of the inventors, which earlier patents and patent application are here included by this reference. Accordingly, these components will not be further described herein, it being understood that these earlier patent and patent application fully disclose a preferred arrangement for providing for varying a flow rate of sorbent materials for a particular pollution condition of a gas stream A, call for a utilization of one or more purging guns 10, as required for a particular pollution content in the gas stream A, and for varying the high voltage power supplied to each purging gun 10 so as fully charge all the particles in the sorbent material flow, with that flow then injected into the polluted gas stream. Which particulate charging, it should however be understood, with the purging gun 10 improvements discussed hereinbelow, requires less electrical power and is more reliable and efficient than earlier charging gun arrangements and provides essentially for charging of all sorbent particles passing through the purging gun 10. Accordingly, the purging gun 10 of the invention is suitable for use for removing pollution particulates from a number of different polluted gas streams.

The sorbent particles that are discharged from the self or continuous purging gun 10 will each have a like electrostatic charge over its entire surface and will therefore the particles will repel one another to be rapidly dispersed in the gas stream. A large electrostatically charged area is thereby provided in the gas stream that attracts and reacts with the pollution particles to form a non hazardous dry by-product. The reaction by-product particles then travel to a particulate removal apparatus, shown as a pollution control filtration device, block 16. An example of such a pollution control filtration device is shown in U.S. Pat. Nos. 5,308,590 and 5,332,562, of one of the present inventors. Or the pollution control filtration device, block 16, can involve another device such as an electrostatic precipitator, a bag house moving media bed filter, or the like, within the scope of this disclosure.

Additionally, two of the present inventors are inventors of a U.S. patent application Ser. No. 08/429,082 for an "Electrostatic Gun for Injection of an Electrostatically Charged Sorbent into a Polluted Gas Stream", that involves a grounding ring or collar or grounding plates for promoting formation of a corona discharge to extend from around a charging electrode to the grounding ring, collar, or grounding plates that the present invention includes, to provide an improvement in corona discharge generation from around a charging electrode.

Like the above and the other patents cited herein, the self or continuous purging gun 10 of the invention is preferably for use in a system for the remediation and elimination of pollutants in a gas stream where a measured flow of a sorbent material, arrow B, selected for the pollutants to be remediated, is directed through the purging gun 10 wherein the sorbent particles receive a same electrical charge, which may be either negative or positive, depending on particular application, during passage through a corona discharge maintained around an end portion 36a or a charging electrode wand that extends radially therefrom towards a grounding ring or collar 31. The selection of which sorbent material considers the sorbent particle size distribution, chemical formula, particle density and their hygroscopic properties for the chemical pollutants to be removed and takes into account that the chemical reaction rate of the sorbent and pollution particles is a surface phenomena, with the sorbent feed rate determined from a consideration of the stoichiometric ratio of the pollutants and sorbent compound.

Shown in FIGS. 1, the flow of sorbent materials, arrow B, is passed into a barrel 21 of the purging gun 10, that is centered longitudinally in a T section housing 20. The barrel 21 is open therethrough, and has a rear portion 22 that is fitted through a rear end cap 23 that, as shown in FIGS. 1 and 2, is maintained across the T section housing 20 rear end. The barrel connects, at a forward end 24, to a barrel coupling 25 that is a sleeve that flares outwardly to a greater diameter forward end to receive a rear end 27 of a barrel charging sleeve 26. The barrel coupling 25 provides a transition from a smaller to greater diameter and receives the barrel charging sleeve 26 telescoped into its forward end. The barrel coupling 25 also provides a smooth wall transition to a flow of purging air, arrow C directed from a purge blower 17, shown as a block, as described in detail herein below. The purging air, arrow C, passes into an open throat section 28 of the T section housing and is distributed within the T section housing to flow, shown as arrows D, along the barrel coupling 25 outer surface to alongside the outer surface of the barrel charging sleeve 26. Thereby, the purging air flow is compressed in a narrow area or chamber between the barrel charging sleeve 26 outer surface and an inner surface of a purging gun barrel 30, that is shown as a straight tube. The purging air flow, arrow D, is thereby accelerated with the reduction in area as it travels into the narrow area or chamber, providing for scouring off and preventing attachment of sorbent particles to a grounding ring 31 during electrostatic charging of the flow of sorbent particles, as described herein below.

Shown best in FIG. 2, to provide for sorbent particle charging a high voltage power supply, shown as block 18, is operated by controller, or the like, not shown, to pass a high voltage through wire 32. The wire 32 contains a pair of wire and connects into a quick disconnect sleeve 33 that has an open end for telescoping over a coupling end of a charging electrode insulator 34 end 34a. The charging wand insulator 34 may be formed or a plastic, ceramic, or like material and contains an electrically conductive center wire or core and is maintained through a fitting 38 secured across a hole 39 that has been formed through the purging gun barrel 30 and through a hole 40 in the barrel charging sleeve 26. The portion of the charging electrode insulator 34 within the barrel charging sleeve 26, is bent at a right angle 35 to be centered along the longitudinal center of the barrel charging sleeve. A forward end of the charging electrode insulator 34 is open centrally to receive a rear end of charging electrode 36 fitted therein, with the charging electrode insulator 34 including a fitting 37 that can be tightened to maintain the charging electrode 36 rear end therein. The charging electrode 36 is thereby centered longitudinally in the barrel charging sleeve 26 with, as shown, forward end portion 36a thereof extending beyond a forward end 41 of the barrel charging sleeve 26. The charging electrode forward end portion 36a is radially aligned with and spaced equally apart from the inner surface of the grounding ring 31. So arranged, as set out herein below, with sufficient electrical power supplied to the charging electrode 36, a corona discharge will be established and maintained around the charging electrode end 36a, extending radially outwardly therefrom towards the grounding ring 31, and extending partially or totally across the barrel charging sleeve 26 end 41 wherethrough the flow of sorbent particles is directed.

The sorbent particles surfaces are charged in their passage through the corona discharge are injected into the polluted gas stream, arrow A, wherein they are disbursed, forming a field that the gas stream is passed through, electrostatically attracting the individual pollution particles. The charged sorbent and pollution particles tend to agglomerate together and chemically react for removal in a pollution control filtration device like those set out and discussed hereinabove. Through, it should be understood, the charged sorbent and pollution particles can be removed utilizing any appropriate system such as a moving media bed system like that shown in the above cited U.S. Pat. Nos. 5,308,590 and 5,332,562, or the systems set out in the U.S. patent application Ser. No. 08/429,082 of two of the present inventions, or can be incorporated in any appropriate pollution control apparatus, within the scope of this disclosure.

In FIG. 1 the purging gun 10 is shown connected through the sorbent discharge tube 12 to the tube 11 wherethrough the gas stream A is passed. Additional support can, of course be included, such as hinges, connectors, or the like, not shown, between the tube 11 and purging gun 10 for maintaining the purging gun 10 positioning. The flow of charged sorbent particles and air passed to the sorbent discharge tube 12, shown as arrows E in FIG. 1, is preferably directed through a constriction section 19 that connected to the forward end 42 of the purging gun barrel 30 and into a rear end of the sorbent discharge tube 12. As shown in FIG. 2, the coupling is accomplished by fitting bolts, not shown, through aligned holes 45 formed through, respectively, a barrel flange 43 and a sorbent discharge tube flange 44. The flow of charged sorbent particles is thereby constricted in its passage through the constriction section 19, increasing its velocity to provide for rapid dispersion in the gas stream A.

Shown in FIGS. 1 and 2, the purging gun 10 includes the T section housing 20 that the purging gun barrel 30 is into and is connected, at its forward end, to the constriction section 19 that connects to the sorbent discharge tube 12. A rear end cap 23 is fitted across the T section housing wherethrough a rear portion 22 the barrel 21 is fitted. The barrel 21, in turn, connects to barrel coupling 25 that mounts to the end of the barrel charging sleeve 26. The barrel charging sleeve 26 is centered along the purging gun barrel 30 center longitudinal axis. Barrel charging sleeve 26 positioning is maintained at its rear coupling to the barrel coupling 25 that couples to the barrel 21 that, in turn, is maintained through the rear end cap 23, by a positioning of set screws 50. The set screws 50 are turned through the sides of purging gun barrel 30 to engage aligned points around the outer surface of the barrel charging sleeve 26, for centering the barrel charging sleeve in that purging gun barrel 30. So arranged, the charging wand 36 is maintained in the longitudinal center of the barrel charging sleeve 26 that is mounted in the longitudinal center of the purging gun barrel 30.

The charging electrode 36 receives a high voltage passed thereto from the H. V. power supply 18, as described above, creating a corona discharge extending radially outwardly therefrom. As shown, the charging electrode 36 end portion 36*a* extends beyond the barrel charging sleeve 26 end 41, to align with the grounding ring 31 that is maintained around the inner surface of the purging gun barrel 30. The ground ring 31 of the invention, it should be understood is preferably like the grounding ring, collar or grounding plates set out and described in the cited U.S. patent application Ser. No. 08/429,082, and may includes the different configurations and designs set out therein, within the scope of this disclosure. The electrode and grounding ring may be made out of noble metals, specially alloyed metals, or the like.

For providing an earth ground 53 to the grounding ring 31 a wire 51 is shown connected to earth ground 53 through head ends of bolts 52 that extend through the barrel 30 and mount the grounding ring 31 thereto. The grounding ring 31 in this invention, like that set out in the above cited U.S. patent application Ser. No. 08/429,082, is maintained at a different charge from that on the charging electrode 36, for providing an electrically attractive surface to a corona discharge that extends radially outwardly from the charging electrode as a corona discharge enhancement. The grounding ring 31 enhancement causes the discharge to extend out from the electrode end portion 36a to essentially extend across the charging sleeve 26 open forward end 41.

As set out above, to provide an electrical charge on the grounding ring 31 that is opposite in charge, either positive or negative, to that on the charging wand 36. Or, alternatively, as set out in the cited U.S. patent application Ser. No. 08/429,082, such power could be supplied, separately from the power supplied to the charging electrode 36, from a power source, such as the H.V. power supply 18, through a controller, not shown, that is capable of providing different charges, positive or negative to the changing electrode 36 and grounding ring 31.

In practice, for the straight charging electrode 36, or for a configuration of charging electrode as shown and described in the cited U.S. patent application Ser. No. 08/429,082, the ground ring 31 will appreciably enhance, over earlier particle charging arrangements, the corona discharge generated from the charging electrode 36, and at lower power requirements than earlier devices. Unfortunately, this improvement in corona discharge has been somewhat negated by the charged grounding ring tending to collect sorbent particles on its surface that interfere with the grounding ring attraction to the corona discharge. In practice, therefore, the benefits of the improvements in corona discharge generation over earlier systems that have not employed ground rings, collars or plates, have not been realized.

The present invention, to overcome this problem of sorbent particle collection on the charged grounding ring 31 surface, employs a continuous high velocity purging air flow to sweep sorbent particles away from the ground ring surface before they can collect thereon. So arranged, the improvement in corona discharge realized by the inclusion of a differently charged grounding ring, collar or plates spaced apart from the changing wand can be fully realized.

The invention provides the scouring purge air flow, arrow C, from the purge blower 17 that directs the purge flow into the T section housing 20 wherein it is directed along the barrel 21 outer surface and across the barrel coupling 25, with the purge flow shown as arrows D. The barrel coupling 25 preferably slopes outwardly across a middle section wherealong the purge air flows into a constriction between the inner surface of the purging gun barrel 30 and the outer surface of the barrel charging sleeve 26. In which constriction the purge air flow, arrow D, accelerates, to strike a collar 55 that is maintained around the barrel charging sleeve 26, proximate to its end 41. Contact with the collar 55 directs and further accelerates the purge air flow over the grounding ring 31 surface. This purge air flow, arrow D, is thereby at a high velocity as it passes over the grounding ring 31 that, in practice, is in excess of one hundred twenty (120) feet per second. A wall of air is thereby created between the grounding ring 31 surface and the sorbent particle flow that prohibits individual sorbent particles from collecting on the grounding ring surface. The purge air flow eliminates any sorbent particle build up on the grounding ring surface as could interfere with field strength and even interfere with sorbent flow. Thereby, the electrostatic field that is the corona discharge generated off from the end 36a of the charging electrode 36 is not interfered with, and a maximum efficiency of sorbent particle charging is maintained during operations.

After passage across the grounding ring 31, the purge air flow combines with the flow of charged sorbent particles, with that combined flow, illustrated as arrows E, then directed into and through the sorbent discharge tube 12 and into the gas stream, arrow A, that is flowing through the tube 11, as described above.

As shown, the charging electrode insulator 34 extends, at an equal a radial distance outwardly from the barrel charging sleeve 26 inner surface to the sleeve center and is in the flow path of the flow of sorbent material. So arranged, the charging wand insulator 34 is subjected to the abrasive action of the sorbent particles striking thereon accordingly should be constructed of a suitable material to avoid abrasion. Insulator 34, in practice, has been formed to include an outer polyvinyl chloride (PVC) plastic shield protecting a high voltage line, but could be formed with the high voltage line cast within a ceramic material, or a like, protective arrangement could be so employed. Also, to promote power transmission efficiency while minimizing current losses at the connection junction and for providing a convenient arrangement for electrically coupling the H. V. Power supply 18 to the purging gun 10, the power cable 32, shown in FIG. 2, is preferably fitted with coupling sleeve 33 that, as shown, is for fitting over the insulator coupling end 34a, to provide a quick disconnect arrangement. The respective barrel 21, barrel charging sleeve 26 and purging gun barrel 30 are preferably formed from an appropriate material to be smooth walled, such as a PVC plastic, to minimize friction losses, and the barrel charging sleeve 26 and purging gun barrel 30 must be formed from an electrically non-conductive material, such as a PVC plastic. Further, in a preferred embodiment, with the increased air flow provided by the purge blower 17 and for the construction of the invention, the sorbent flow rate has been increased to up to eleven hundred (1100) pounds per hour (lbs/hr) from a maximum flow rate of seven hundred fifty (750) pounds per hour (lbs/hr) for the electrostatic gun set out in U.S. patent application Ser. No. 08/429,082. For this sorbent flow, a voltage of approximately 40,000 volts at 0.0012 amps has been utilized. The voltage is preferably variable and for a minimum flow of sorbent materials of approximately five (5) pounds per hour (lbs/hr), a voltage of 10,000 volts at 0.00008 amps has been utilized. Also, varying the sorbent material flow may require selection of a different barrel diameter from a barrel charging sleeve 26 as has been used that has a diameter of four (4) inches and purging gun barrel 30 diameter of six (6) inches. Which diameters, in practice, are selected to meet the flow requirements, and so, it should be understood, any appropriate barrel diameter can be used within the scope of this disclosure. Additionally, in practice, while a flow of sorbent materials is preferably transferred at a pressure of from one (1) to five (5) psi through the tube 21 that is approximately two (2) to three (3) inches in diameter, of course another diameter of tube 21 could be so used within the scope of this disclosure.

In practice, for a sorbent material flow of from 1 to several hundred pounds per hour, a voltage of 5,000 to 300,000 volts, is selectively passed to charging electrode 36. This voltage is greatly decreased from the voltage that was required in earlier systems like that set out in the above cited U.S. patents of one of the inventors, and provides a more consistent and uniform corona discharge than that as provided by the device of the cites U.S. patent application Ser. No. 08/429,082 of two of the inventors. Accordingly, a more efficient particle charging is provided by the invention than has heretofore been possible, with the high voltage supplied to charging electrode 36 controlled to maintain a uniform high voltage corona discharge therearound. Which corona discharge extends from the charging electrode forward end 36a to the grounding ring 31, extending across the purging gun barrel 30, to negatively or positively charge each sorbent particle that passes out from the barrel charging sleeve 26 end 31.

As set out above, the charged sorbent particles are then injected through the sorbent discharge tube 12 and into the tube 11 that contains the polluted gas stream, arrow A. Therein, the sorbent particles all bear the same negative or positive charge, and tend to repel one another so as to be rapidly dispersed throughout that polluted gas stream. A utilization, in a practice of the invention, of very fine-grained sorbent particles that will tend to significantly increase the sorbent's activity and considerably reduce the residence time required for their complete dispersion into the polluted gas stream, is preferred. The charged particles themselves attract both submicron and larger particulates in the gas stream, agglomerating with them to form larger particles or masses. Additionally, the charged sorbent particles also provide for chemically reacting with pollutants in the stream and forming a large area for charging particulates that are not already agglomerated. The gas stream with entrained sorbent is then directed into a pollution control filtration device 16, as discussed hereinabove.

Dependant upon the characteristics of the gas stream pollutants and their volume in the gas stream, arrow A, a single purging gun 10 may be sufficient to provide a required flow of electrostatically charged sorbent particles into that gas stream to fully charge of all the particulates in that flow, including submicron size particulates. A single purging gun 10 may, however, not be sufficient to supply a required sorbent output, even taking into account a capability for an increase or decrease in system capacity by adjustment of a required output from the sorbent hopper 13, a selection of an appropriate size of barrel 21 and controlling of the voltage transmitted to the charging electrode 36. Accordingly, the invention can include, within the scope of this disclosure, a second, third of more purging guns 10, each functioning as described above. Such second and additional purging guns 10 are preferably identical to the described purging gun 10.

Unique to the invention is the inclusion of the purge air flow and arrangement for providing same as a scouring air flow that is directed over the grounding ring 52 surface, to maintain a consistent corona discharge during operations. As set out above, the preferred grounding ring 31 is like that described above and in the cited U.S. patent application Ser. No. 08/429,082 of two of the present inventors, that is formed from an electrically conductive material and is insulated from the purging gun barrel 30. The charge received at the grounding ring 31, it should be understood, is less than that transmitted to the charging electrode 36, and may be either positive or negative so long as that charge is opposite to the charge of the high voltage transmitted to the charging electrode 36. Therefore, as set out above, the high voltage present in the charging electrode 36 will tend to be attracted to the grounding ring 31 surface and an enhanced corona discharge extending from around the charging electrode end 36a is thereby provided at a lesser power than has been required for earlier electrostatic guns. Which corona discharge effect will extend and fill the area across the barrel charging sleeve 26 end 41, extending essentially to the inner surface of the grounding ring 31, whose surface, in practice, is spaced apart from two (2) to four (4) inches radially from the charging electrode end 36a, to provide an optimum corona discharge. So arranged, essentially all the sorbent particles that travel through the barrel charging sleeve 26 will pass through the electron field created by the corona discharge surrounding the charging electrode 36, as described, and will be electrostatically charged in that passage.

Tables I, II, and III, herein reproduced below, show where, utilizing the invention, in excess of ninety (90) percent removal of sulphur dioxide (SO2) at mass ratios of 1.3:1 (Lime:SO2) was accomplished with a residence time of 1.1 second at temperatures of three hundred (300) degrees F. This is a most significant improvement over earlier results of forty (40) percent or less SO2 removal under like conditions as were common. With a utilization of the present invention, it is believed that in excess of ninety (90) percent of the sorbent materials as are passed through the purging gun 10 will effectively acquire an electrostatic charge which particle charging results in approximately a ninety seven point two (97.2) percent removal of the combined charged sorbent and pollutant particles from gas stream, arrow A, traveling through tube 11.

Tables I, II and III, hereinbelow represent, independent laboratory EPA method stack sampling tests, (I) inlet/outlet particulate removal, (II) inlet/outlet SO2 gas removal across gravel bed filter, (III) inlet/outlet SO2 gas removal in front of gravel beds measuring removal in the duct work only.

TABLE I

DATE: 08/03/95

| TIME | RUN # | GRAINS/DRY STANDARD CUBIC FOOT | POUNDS PER HOUR | ACTUAL WET CUBIC FEET PER MINUTE | STANDARD DRY CUBIC FOOT/HOUR | TEMPERATURE STACK | % CO2/O2 V/V DRY |
| --- | --- | --- | --- | --- | --- | --- | --- |
| 0803-0842 | 1-INLET | 10.0086 | 797.4 | 21,021 | 5.577 | 318.2 23.4 | 7.9/12.0 |
| 0800-0837 | 1-OUTLET | 0.0612 | 1.7 | 4,651 | 1.907 | 128.3 10.6 | 3.9/16.2 |
| 0954-1020 | 2-INLET | 10.5320 | 694.0 | 18,654 | 4.612 | 296.0 30.6 | 8.1/11.8 |
| 0955-1017 | 2-OUTLET | 0.1062 | 2.7 | 4,754 | 1.787 | 140.7 16.3 | 3.8/16.2 |
| 1425-1500 | 3-INLET* | 1.9082 | 138.9 | 20,080 | 5.095 | 284.7 29.9 | 8.5/11.4 |
| 1420-1453 | 3-OUTLET | 0.0461 | 1.2 | 4,754 | 1.774 | 139.5 17.1 | 4.0/16.1 |

*2 bottom ports only

TABLE II

DATE: 08/03/95

| TIME | RUN | PARTS PER MILLION SO2 | POUNDS PER HOUR SO2 |
|---|---|---|---|
| 0803-0842 | 1-INLET | 94.8 | 11.4 |
| 0800-0837 | 1-OUTLET | 0.0 | 0.0 |
| 0954-1020 | 2-INLET | 64.8 | 4.9 |
| 0954-1017 | 2-OUTLET | 0.0 | 0.0 |
| 1425-1500 | 3-INLET* | 61.6 | 5.2 |
| 1420-1453 | 3-OUTLET | 0.0 | 0.0 |

*2 bottom ports only

TABLE III

DATE: 08/03/95

| TIME | RUN 3 | SO2 PPM (ACTUAL) | SO2 PPH × 10[6] | AWFCM deg. f | SDCFH v/v | TEMP v/v dry | % H2O | % CO2/O2 |
|---|---|---|---|---|---|---|---|---|
| 1621-1652 | 4A-INLET after lime injection | 1.36 | 0.32 | 36,338 | 1.052 | 275.3 | 20.98 | 3.6/14.7 |
| 1610-1642 | 4B-INLET before lime injection | 73.69 | 11.41 | 36,603 | 0.935 | 273.7 | 30.41 | 10.4/9.5 |

While a preferred embodiment of our invention in an improved purging electrostatic gun for use in electrostatically charging and injecting electrostatically charged sorbent particles into a polluted gas stream for the remediation of the gas stream, has been shown and described herein, it should be understood that the present disclosure is made by way of example only and that variations and changes thereto are possible without departing from the subject matter coming within the scope of the following claims, and a reasonable equivalency thereof, which claims we regard as our invention.

We claim:

1. A purging electrostatic gun for charging and injecting a flow of a sorbent material into a polluted gas stream for passage to an apparatus for removing particulates comprising, a gun housing that includes a purging gun barrel and contains a tube means that connects to a sorbent dispensing means for passing a measured flow of sorbent materials under pressure into said tube means; a straight barrel charging section that is open therethrough and connects on a rear end to said tube means to receive the measured flow of sorbent materials under pressure and has an open forward end; a discharge means mounted across an open forward end of said purging gun barrel for receiving a flow of electrostatically charged sorbent materials that is connected to pass said flow into a pipe wherethrough a polluted gas stream flows, with said pipe connected to a pollution control filtration device means; a charging electrode formed from an electrically conductive material that is centered axially in said barrel charging section, with a forward portion of said charging electrode extending beyond said open forward end of said barrel charging section; means for connecting said charging electrode to a high voltage source; means for controlling the voltage passed from said high voltage source into said charging electrode; a grounding means mounted in said straight barrel and spaced an appropriate radial distance apart from said charging electrode forward portion; and means for providing a flow of purging air under pressure with means for directing said flow of purging air into said gun housing to travel across said grounding means, scouring any sorbent particles therefrom and mixing with said charged sorbent materials.

2. A purging electrostatic gun as recited in claim 1, wherein the gun housing includes a T shaped section that includes a straight open tube with an open cylinder connecting at a right angle to said tube, a rear end of said open tube having an end cap fitted thereover wherethrough the tube means that the sorbent material travel through is fitted, with a forward end of said open tube fitted to the purging gun barrel, and said open cylinder connects to the means for providing a flow of purging air under pressure.

3. A purging electrostatic gun as recited in claim 2, wherein a forward end of the open tube means receives a rear end of a barrel coupling fitted therethrough that includes a forward end that receives a rear end of the barrel charging section fitted thereto.

4. A purging electrostatic gun as recited in claim 3, wherein the barrel charging section has a greater diameter than the tube means, and the barrel coupling slopes outwardly across a midsection thereof to a forward end that receives the barrel charging section rear end telescoped therein.

5. A purging electrostatic gun as recited in claim 3, wherein the interior diameter of the purging gun barrel is slightly greater than the outside diameter of the barrel charging section, providing a reduction in area wherethrough the flow of purging air from the T-shaped section travels.

6. A purging electrostatic gun as recited in claim 5, wherein the grounding means is a ring or collar that has an electrically conductive surface and is secured to the purging gun barrel inner surface, whereby at least a portion of said ring or collar is forward of a forward end of the barrel charging section and is immediately opposite to a forward portion of the charging electrode.

7. A purging electrostatic gun as recited in claim 5, further including a deflecting collar means secured around the outer circumference of said barrel charging section, adjacent to its forward end and immediately opposite to the grounding ring or collar, for narrowing the distance from an outer surface of the deflecting collar means to the grounding ring or collar, wherethrough the flow of purging air travels.

8. A purging electrostatic gun as recited in claim 7, wherein an inner surface of the grounding ring or collar is spaced a radial distance of approximately three (3) inches from the surface of the charging wand forward portion.

9. A purging electrostatic gun as recited in claim 1, wherein the flow of purging air under pressure is passed through a tube or hose into an open top end of the open cylinder of the T-shaped section.

10. A purging electrostatic gun as recited in claim 1, wherein charging electrode forward portion is centered longitudinally in the barrel charging section and has its middle and rear end portions maintained within an insulator that is bent at a right angle across approximately its center to extend through a hole formed through a rear portion of the barrel charging section and through a hole formed through a rear portion of the purging gun barrel, and connects at a rear end to a sleeve that is arranged to receive a male coupling fitted into said sleeve for electrically coupling said sleeve to the high voltage source.

11. A purging electrostatic gun as recited in claim 10, wherein the insulator is formed from a synthetic urethane or other non-conductive material.

12. A purging electrostatic gun as recited in claim 10, wherein the insulator is formed from a ceramic material.

13. A purging electrostatic gun as recited in claim 1, further including bolt means fitted through, at spaced points around, the purging gun barrel for turning to move ends of said bolt means into engagement with the outer surface of barrel charging section for longitudinally centering said barrel charging section in said purging gun barrel.

14. A purging electrostatic gun as recited in claim 1, wherein the flow of purging air is at a velocity of approximately one hundred twenty (120) feet per second when it travels across the surface of the grounding means that is opposite to the charging electrode forward portion.

15. A purging electrostatic gun as recited in claim 1, wherein the charging electrode is a straight narrow section of a solid electrically conductive material that has essentially a uniform cross section along its forward portion and is formed from noble metals or specially alloyed conductive metals.

* * * * *